3,046,167
HEAT-TREATING METHOD AND PRODUCT
James H. Waxweiler, Middletown, Ohio, and Robert M. Larrimore, Jr., Baltimore, Md., assignors to Armco Steel Corporation, a corporation of Ohio
No Drawing. Filed May 19, 1960, Ser. No. 30,090
6 Claims. (Cl. 148—135)

Our invention has broad application to the chromium-nickel stainless steels possessing heat-hardenable properties; more particularly, it concerns welded products formed of such steels, primarily in the form of sheet, strip and plate.

An object of our invention is to provide a method of heat-treating age-hardenable chromium-nickel stainless steel welded products, primarily those formed of sheet, strip and plate, which imparts increased ductility and toughness within the weld metal and parent metal as well, without regard to minor variation of parent metal and weld, which method is conducted at comparatively low heat-treatment temperatures maintained at practical and acceptable time limits.

Another object is to provide welded products primarily in the form of sheet, strip and plate, of heat-hardenable chromium-nickel stainless steel which, when treated according to the practice of our new art, display in the hardened condition thoroughly acceptable properties of strength, ductility and toughness, bearing practical relationship to corresponding mechanical properties of unwelded parent metal.

Other objects and advantages will in part be obvious and in part pointed out hereinafter during the course of the following description.

Our invention, accordingly, resides in the several heat-treatment steps including both the temperature and duration thereof, and in the relation of each step to and with one or more of the others, the scope of the application of all of which is more fully set forth in the claims at the end of this disclosure.

As conducive to a more thorough understanding of our invention, it is worthy to note that stainless steel sheet, strip and plate are employed with increased scope in a wide variety of modern-day applications. Typically, consider the production of wings for aircraft. With present-day high speed operation, where aerodynamic drag increasingly becomes a major factor, the wings are formed of bright, corrosion-resistant lightweight structures displaying high values of mechanical strength. And to permit ready fabrication, along with avoidance of both directionality and work-produced strains, the industry has turned to the age-hardenable alloys, in preference to those metals which are work-hardenable, especially the age-hardenable chromium-nickel stainless steels such as Armco "17–7PH" (about 17% chromium, 7% nickel, 1% aluminum and remainder iron).

In the use of the age-hardenable "17–7PH" stainless steel sheet, strip and plate for modern-day practice it frequently becomes necessary to produce an intimate, unitary product built up of a number of sheets, plates and the like. This practice is frequently dictated by the size and configuration of the products, in the production of which such steel is employed. And to that end it becomes necessary to weld together the various sections of sheet, strip or plate as the case may be. Ordinarily, butt-welding is resorted to, although of course lap welding, seam-welding, spot-welding or other welding practices may be employed as and when indicated. Fabrication is carried to completion while the steel is in its soft or solution-treated condition. Such welding as is required, of course, is performed while the metal remains in the solution-treated condition. This contributes towards ease in handling, while reducing wear and tear on forming equipment. As well, it minimizes the time required for fabrication.

Following fabrication, including requisite welding, it has heretofore been customary to harden the fabricated products in one of the customary heat-treatments known to the industry. Typically, such hardening treatment is conducted at comparatively low heat-treating temperature. Illustratively, a transformation step may be resorted to followed by an age-hardening step. Transformation is had either by heating at about 1400° F. and cooling to room temperature, or by heating at about 1750° F. followed by refrigeration at about −100° F. Austenite is thereby converted to martensite in either case. Transformation then is followed by hardening by reheating at a temperature of 800° F. to 1200° F. and cooling.

A material disadvantage of the customary practice is that upon hardening according to conventional practice there is observed a substantial sacrifice in ductility at the weld. This is true, both as referred to the soft or solution-treated condition of the welded products and to the unwelded parent metal in its hardened condition. The weld lacks both ductility and toughness. It is comparatively brittle. Upon fracture of test specimens, the grain structure of the weld is found to be coarse as contrasted with the fine grain structure of the base metal. To provide a scale of coarseness to be referred to hereinafter the cleavage-type grain structure which characterizes products thus treated may be considered as being 100% coarse while the grain structure in as-welded condition, viewed as 100% fine.

Moreover, in the production of weldments following the customary prior art practice, casual vagaries in composition are found to have important and somewhat unpredictable influence on the welding properties of precipitation-hardenable alloys, even though the chemical analyses of these steels are essentially the same. Illustratively, and following conventional practice, while products formed from one heat of metal of given analysis are found to have comparatively good welding properties, with failure upon test in hardened condition observed in the parent metal, products produced from another heat of the same general composition, but differing from the first in casual and seemingly minor percentages, display poor welding qualities, with failure, while in hardened condition, observed in the region of the weld. Upon test, it is found that the values for ductility and toughness vary unpredictably from heat to heat and in any event depart substantially from like values of the unwelded parent metal.

An object of our invention is to provide a simple and direct mode of heat-treating stainless steel weldments of the general type described, the several operational steps of which are conducted at comparatively low heat-treating temperatures and in the substantial absence of detrimental scaling or loss of dimensions, and which method permits the realization of fabricated products which, in hardened condition, display required mechanical strength, toughness and requisite degrees of ductility, such values being substantially uniform from heat to heat of metal of the same grade and closely similar to the corresponding properties of the unwelded parent metal.

In the practice of our invention we find that the well-known "17–7PH" stainless steels, following welding, respond admirably to an intentional transformation of the weld metal, followed by re-anneal, prior to being given a standard heat-treatment for hardening the metal, namely transformation and age-hardening. Essentially, and according to our practice, we subject the welded products, prior to hardening, to double transformation treatment, with intermediate anneal. Requisite qualities of both ductility and toughness are observed to attend such treat-means of the "17-7PH" steel.

As to the practice of the prior art, it is to be noted for comparison purposes that when sheets, strips or plate of this metal are first welded, and then directly subjected to heat-treatment according to conventional transformation and hardening technique, the mechanical properties of the weldment itself in hardened condition display greatly reduced and insufficient ductility and toughness as compared to the base, unwelded but hardened parent metal. In striking contrast, we find that upon subjecting weldments from the same heat, first to a preliminary transformation, and this followed by re-anneal, all prior to application of the complete standard heat-treatment, including a second transformation, then marked increase in both ductility and toughness is observed in the region of the hardened weld metal. A new grain structure is observed. The improvement in ductility and toughness is remarkable.

As specifically illustrative of the practice of our invention there was built up a weld deposit from the filler wire of analysis set out in Table I:

TABLE I

*Chemical Analysis of "17-7PH" Filler Wire*

| C | Mn | P | S | Si | Cr | Ni | Al | Fe |
|---|---|---|---|---|---|---|---|---|
| .069 | .74 | .020 | .020 | .33 | 17.21 | 7.26 | 1.25 | Remainder |

The weld deposit metal was cut into a series of samples which were notched and variously heat-treated. Comparative samples were broken and grain structure investigated, all as reported in Table II below:

TABLE II

*Heat-Treatment and Nature of Fracture of Samples of the "17-7PH" Stainless Steel of Table I*

| Sample | Heat-Treatment | Fracture |
|---|---|---|
| 1 | A+T | 100% Fine. |
| 2-11 | A+T+H | 100% Coarse. |
| 12 | A+T+1,200° F. for 1½ hrs. air-cool | 100% Fine. |
| 13 | A+T+A+T+H | 50% Fine. |

"A"—Anneal: Heat 1900° F. for ½ hr. and water-quench.
"T"—Transform: Heat 1400° F. for 1½ hrs. and cool in air, oil or water to room temperature.
"H"—Age-harden at 800° F. to 1100° F. for 1½ hrs. and air-cool.

Samples Nos. 2–11 merely annealed, transformed (heated at 1400° F. for 1½ hrs. and cooled in air, oil or water) and then age-hardened at 800° F. to 1100° F. for 1½ hrs. and air-cooled, when fractured show a coarse grain structure designated 100% coarse. The sample No. 12 when similarly air-cooled, transformed and age-hardened at 1200° F. fractured with a fine grain structure denoted 100% fine. But this sample drastically suffers in strength; the metal is "over-aged" when hardened at the 1200° F. temperature. The sample No. 13, however, which is not over-aged with loss of mechanical properties, but which is given a double transformation treatment, with intermediate anneal, shows a grain structure denoted 50% fine when fractured. The double transformation treatment thus is definitely beneficial to weldments of the age-hardening stainless steels.

As a further illustration of the practice of our invention we laid down a weld on a solid sheet of "17-7PH" stainless steel 9" wide by 22" long and about .050" thick while in condition "A," i.e. a soft mill-annealed condition. The weld pad was laid down longitudinally on the piece of sheet and centrally thereof. For uniformity in results we elected to employ a heliarc welding process, although of course any suitable and conventional welding technique could be employed. The chemical analysis of the sheet metal is set out in Table III below:

TABLE III

*Chemical Analysis of Sample "17-7PH" Stainless Steel Sheet*

| Heat No. | C | Mn | Si | Cr | Ni | Al |
|---|---|---|---|---|---|---|
| 45534 | .070 | .71 | .29 | 17.15 | 7.13 | 1.18 |

The weldment was produced through recourse to a straight polarity, direct current of approximately 160 amperes, the welding head travelling at about 22 inches per minute. Filler wire, closely responding in analysis to the alloy undergoing welding and of 1/16" diameter, was fed at like rate. The arc was shielded by argon flowing at a rate of 30 cubic feet per hour. Fusion was complete, while burn-in was adequate, based on visual examination. We resorted to the use of filler wire to insure a larger weld pad, this to minimize the amount of undercutting.

In the series of tests, the test specimens were sheared from the sheet with the weld bead running transverse to the direction of the specimen, then annealed, transformed, machined to size, re-annealed, transformed and age-hardened. Each specimen was transformed by heating at 1400° F. and cooling, then re-annealed at 1950° F. for a period of two minutes followed by air-cooling to room temperature, then re-transformed by again heating at 1400° F. enduring for 90 minutes followed by air-cooling to 60° F. for a period of 30 minutes, and then hardened by age-hardening at 1050° F. for 90 minutes. Test specimens in the finally hardened condition according to our invention were compared with control specimens in hardened condition, which specimens had not had the benefit of the intermediate anneal and preliminary transformation. The properties of toughness, ductility and hardness, were determined. Comparative data is set forth in the following Table IV:

TABLE IV

*Mechanical Properties of the Sheet Sample of Table III in the Transformed and Hardened Condition and in the Transformed, Annealed, Retransformed and Hardened Condition*

| Condition | .2% Y.S. p.s.i. | U.T.S., p.s.i. | Percent El. in 2" | Hardness Rc |
|---|---|---|---|---|
| Unwelded T+H | 187-187,200 | 198-199,200 | 8-8 | 43.5 |
| Welded T+A+T+ H for all three samples. | 182,200 183,000 180,800 | 198,600 197,400 196,100 | 8 7 6 | 43.5 44 44 |

"T"—Transform: Heat at 1400° F. and cool to room temperature.
"A"—Anneal: Heat at 1900° F.
"H"—Age-harden: Heat at 1050° F.

We found that test specimens comprising the subject of Table III and treated according to our invention uniformly broke in the parent meal; none broke in the weld. The tensile strengths of the test specimens were found to be both uniform with respect to each other, about 183,000 p.s.i. yield strength, and about 197,000 p.s.i. ultimate tensile strength. Advantageous and noteworthy is the close resemblance which these values bear to the corresponding values had for the unwelded sheet in hardened condition.

Our investigation discloses that the intermediate anneal which we employ apparently brings about a change of structure from the essentially martensitic condition had with the first transformation into a condition which is substantially austenitic. Although we are by no means certain, and do not care to be bound by the explanation, we believe that the re-austenitizing treatment, in effect, brings about a break-up of the columnar dendrites commonly found in a weldment and restores to some extent, the initially fine grain structure. That is, the essentially dendritic grain structure which attends welding, is destroyed upon re-anneal following the initial transformation. And this structure is replaced by a refined grain structure.

More particularly, in welding the age-hardening stainless steels the weld metal itself in solidifying from the molten state is found to have a preferred dendritic structure. Planes of weakness develop in the direction of the dendrites. This results in poor ductility. And the fracture had is of a cleavage type.

Now in transforming the steel to a martensitic structure in accordance with our invention, an internal strain results. The phase transformation encountered is sufficient to effect recrystallization, and re-orientation of the grains, upon re-annealing. Where the steel is merely annealed after welding we find that the desired result is not had; a mere anneal, without more, apparently does not sufficiently disturb the prior orientation of grains; no internal strain appears to be encountered. It is the transformation treatment immediately following the welding which creates a strain sufficient to trigger the re-orientation of grains when the metal is then annealed. And upon further transformation and age-hardening the desired mechanical properties are had, all with the good ductility achieved with the re-oriented grain structure.

In the weldments of our invention both yield strength and ultimate tensile strength in the region of the weld are approximately equal to like properties of a non-welded sheet of the same material, but similarly hardened. And the same obtains in the matter of ductility, an elongation of about 6% to 8% is had in the welded metal treated in accordance with our invention and about the same value obtained in the unwelded sheet in hardened condition. This good ductility is in striking contrast to the usual 1% to 2% elongation which characterizes the weldments subjected directly to age-hardening without recourse to the intermediate transformation and annealing treatment which characterizes the practice of our invention.

It is our view that the more times a weldment is subjected to intermediate transformation and annealing, following welding but prior to final hardening, the finer is the grain structure had in the hardened product. As well, the more uniform are the results obtained, and the closer the identity of the mechanical properties within the weld metal itself to the like properties in the surrounding hardened but unwelded metal. From a practical standpoint, however, more than one intermediate transformation and anneal is not indicated; we feel that satisfactory results attend a single transformation and re-anneal, attended by subsequent transformation and age-hardening.

While in the illustrations given above we have emphasized the use of a standard TH 1050 heat-treatment to bring about hardening following re-anneal, we may employ the conventional RH 950 heat-treatment also disclosed. Moreover, we find that good results are had where the two transformation treatments differ from one another. Illustratively, the first transformation treatment may comprise heat-treatment initially at 1750° F., followed by refrigeration treatment at about −50° to −100° F., with the second transformation treatment, following intermediate anneal, conducted at about 1400° F. And where desired, the sequence of transformation technique may be reversed. That is, the first transformation may be at about 1400° F., while the refrigeration transformation technique may be resorted to as the second transformation. Age-hardening is had by heating at a temperature of 900° to 1100° F.

The practice of our invention also is applicable to the "PH15–7Mo" grade of stainless steel (about 15% chromium, 7% nickel, 2% molybdenum, 1% aluminum, and remainder substantially all iron). Sample welds of "PH15–7Mo" were prepared using heliarc automatic welding with an electrode speed of 13½" per minute. "PH15–7Mo" welding wire of 1/16" diameter was supplied at the rate of 11" per minute. And the spacing between the tips of the tungsten electrodes employed was 0.060". There was used a current density of 60 amperes per square inch. The flow of shielding helium gas was at a rate of 50 cu. ft. per hour.

Metal from three different heats was tested, the chemical analysis of each of which, as well as that of the filler wire (Heat 038021) is set forth in the following Table V:

TABLE V

Chemical Composition of Three Samples of "PH15–7Mo" Stainless Steel Sheet and One Sample Filler Wire (Heat 038021)

| Heat No. | C | Mn | P | S | Si | Cr | Ni | Mo | Al |
|---|---|---|---|---|---|---|---|---|---|
| 56251 | .070 | .69 | .019 | .017 | .20 | 15.05 | 7.16 | 2.30 | 1.26 |
| 880362 | .070 | .66 | .017 | .012 | .47 | 15.08 | 7.20 | 2.40 | 1.16 |
| 46733 | .075 | .68 | .024 | .011 | .39 | 15.16 | 7.23 | 2.29 | 1.19 |
| 038021 | .069 | .10 | .008 | .017 | .17 | 12.75 | 7.46 | 2.06 | .84 |

Preliminary tests indicated that while the three samples of PH15–7Mo obviously respond to closely similar chemical analyses, nevertheless preliminary and conventional welding tests indicated that the sample of Heat No. 56251 welded poorly, Heat No. 46733 fairly well, while Heat No. 880362 was comparatively good. The suitability for welding was based primarily on the ductility of the weldment after heat-treating.

The specimens, subsequent to welding, were first transformed by a refrigeration treatment comprising heating at 1750° F., followed by holding at −100° F. for a substantial duration. Thereupon, they were re-annealed at 1950° F. and then re-transformed by heating at 1750° F. followed by refrigeration at −150° F. Final hardening was achieved by reheating at 950° F.

The double transformation treatment of our invention produces surprisingly uniform results from heat to heat, with elongation of approximately 3% in 2", and about 9.3% in ½". This, in sharp contrast with an elongation of about 1% in 2", and about 4% in ½" on mill specimens which were subjected to but a single transformation treatment and then hardened. Ready comparison of the ductility had with the conventional single treatment and that had with our double transformation treatment for the three heats of Table V is given in the following Table VI:

TABLE VI

Comparative Elongation Figures for the Samples of Table V When Hardened After Single Transformation and After Double Transformation With Intermediate Anneal

| Heat No. | Percent El. in 2" | Percent El. in ½" | |
|---|---|---|---|
| 56251 | 1 | 4 | Single transformation. |
| | 3 | 9.3 | Double Transformation. |
| 880362 | 2 | 6 | Single Transformation. |
| | 3 | 9 | Double Transformation. |
| 46733 | 2.3 | 8 | Single Transformation. |
| | 2.7 | 9 | Double Transformation. |

The results reported in Table VI show a wide variation in ductility from heat to heat where resort is had only to the single transformation treatment according to the prior art. On the other hand, where recourse is had to our double transformation treatment, uniform results are observed; the values obtained bear close approximation to the corresponding values in the hardened but unwelded parent metal. Our new double heat-treatment tends to make all heats of the same general composition of about equal ductility.

From the foregoing it is apparent that through application of our double transformation treatment to the age-hardenable chromium-nickel stainless steels, weldments can be predictably and uniformly obtained which display high values in ductility and toughness, closely approximating that of the parent, unwelded but hardened metal. Particular advantage attends the welding of comparatively thin metal sections such as sheet, strip and plate. The field of utility for such products is thus materially enlarged. Load potential is not limited by weld strengths. On the contrary, operational failure of the welded products may be anticipated to depend almost entirely upon the mechanical strength of the unwelded parent metal. No limitation is imposed by mode of welding.

While we have described our invention largely with respect to the "17–7PH" and "PH15–7Mo" stainless steels, we find that it is admirably suited for treating the "17–4PH" and "PH12–8–6" steels (about 17% chromium, 4% nickel, 3% copper, and remainder iron for the one; and about 12% chromium, 8% nickel, 6% molybdenum, 1% aluminum, and remainder iron for the other). Satisfactory results attend the application of our new art to other age-hardening steels.

Thus it will be seen that we provide an art or method in which the various objects hereinbefore set forth are successfully achieved. All the foregoing as well as many other highly practical objects and advantages attend the practice of our invention.

It is apparent that many modifications of the embodiments disclosed above may occur to those skilled in the art, and many other embodiments thereof will likewise be suggested. Accordingly, we intend the foregoing disclosure to be construed as merely illustrative, and not by way of limitation.

We claim as our invention:

1. A method of heat-treating welded age-hardenable chromium-nickel stainless steel to impart thereto, while in hardened condition, a high degree of both ductility and toughness, which method comprises the sequential steps of welding; transforming the welded products to a structure which is essentially martensitic but which includes some ferrite; thereupon restoring the steel to a structure which is essentially austenitic although containing some ferrite, through annealing at a temperature and for a time sufficient to re-austenitize the martensite and ferrite and break up the original cast-weld structure; re-transforming the metal to a structure which is essentially martensitic, together with very little ferrite; and finally hardening the metal, through appropriate heat-treatment, to a condition which is essentially all martensite.

2. In the processing of age-hardenable chromium-nickel stainless steel products selected from the group consisting of steels analyzing approximately 17% chromium, 7% nickel, 1% aluminum, and remainder iron; approximately 17% chromium, 4% nickel, 3% copper, and remainder iron; approximately 15% chromium, 7% nickel, 2% molybdenum, 1% aluminum, and remainder iron; and approximately 12% chromium, 8% nickel, 6% molybdenum, 1% aluminum, and remainder iron, the method which comprises first welding the products in a shielded arc process; then transforming the welded products by heating at about 1400° to 1750° F. and cooling to about room temperature to −100° F.; subsequently re-annealing the transformed products at about 1950° F.; then re-transforming the products by heating and cooling as above; and finally age-hardening them by heating at about 900° to 1100° F.

3. The method of heat-treating stainless steel age-hardenable welded products, comprising first transforming the products, following welding, through treatment at about 1400° F. followed by cooling to room temperature; then re-annealing the products at about 1950° F.; subsequently re-transforming the products through a second heat-treatment at about 1400° F. followed by cooling to room temperature; and then hardening by heating at a temperature of about 900° F. to 1100° F.

4. The method of heat-treating stainless steel age-hardenable welded products, comprising first transforming the products, following welding, through treatment at about 1400° F. followed by cooling to room temperature; then re-annealing the products at about 1950° F.; subsequently re-transforming the products through a second heat-treatment at about 1750° F., followed by a sub-zero treatment at about −100° F.; and then hardening by heating at a temperature of about 900° F. to 1100° F.

5. The method of heat-treating stainless steel age-hardenable welded products, comprising first transforming the products, following welding, through treatment at about 1750° F. followed by a sub-zero treatment at about −100° F.; then re-annealing the products at about 1950° F.; subsequently re-transforming the products through a second heat-treatment at about 1400° F., followed by cooling to room temperature; and then hardening by heating at a temperature of about 900° to 1100° F.

6. The method of heat-treating stainless steel age-hardenable welded products, comprising first transforming the products, following welding, through treatment at about 1750° F. followed by a sub-zero treatment at about −100° F.; then re-annealing the products at about 1950° F.; subsequently re-transforming the products through a second heat-treatment at about 1750° F., followed by a sub-zero treatment at about −100° F.; and then hardening by heating at a temperature of about 900° to 1100° F.

References Cited in the file of this patent

UNITED STATES PATENTS

| | | |
|---|---|---|
| 2,482,098 | Clarke | Sept. 20, 1949 |
| 2,732,323 | Linnert | Jan. 24, 1956 |